UNITED STATES PATENT OFFICE.

ROBERT E. SCHMIDT, OF ELBERFELD, AND ADOLF SERTORIUS, OF FLITTARD, GERMANY, ASSIGNORS TO FARBENFABRIKEN OF ELBERFELD CO., OF NEW YORK, N. Y., A CORPORATION OF NEW YORK.

GREEN ANTHRAQUINONE DYE AND PROCESS OF MAKING SAME.

SPECIFICATION forming part of Letters Patent No. 687,657, dated November 26, 1901.

Application filed April 29, 1901. Serial No. 58,059. (No specimens.)

*To all whom it may concern:*

Be it known that we, ROBERT E. SCHMIDT, residing at Elberfeld, and ADOLF SERTORIUS, residing at Flittard, near Cologne, Germany, both doctors of philosophy and chemists, (assignors to the FARBENFABRIKEN OF ELBERFELD CO., of New York,) have invented a new and useful Improvement in Green Anthraquinone Dyes and Processes of Making Same; and we hereby declare the following to be a clear and exact description of our invention.

Our invention relates to the manufacture of new green dyestuff sulfonic acids of the anthracene series by causing sulfonating agents to act on anthraquinone derivatives having the following general formula:

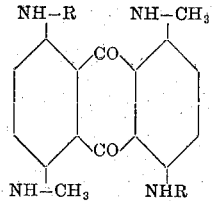

I.

(R meaning in this formula an alphyl radical, such as phenyl, tolyl, xylyl, or the like.) The said anthraquinone derivatives can be obtained, for instance, by condensing the symmetrical paradinitro 1-5-dimethyldiamidoanthraquinone having the formula:

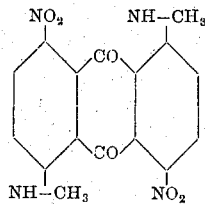

II.

or the symmetrical paradibromo 1-5-dimethyldiamidoanthraquinone of the formula:

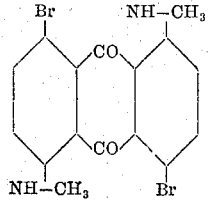

III.

with primary aromatic amins. The resulting condensation products crystallize in the shape of dark-green or dark-greenish-blue crystals, insoluble in water, soluble in hot pyridin and anilin with a green color.

In order to produce the said bodies, we can proceed as follows, the parts being by weight: A mixture of ten parts of symmetrical paradibromo 1-5-dimethyldiamidoanthraquinone having the above-given formula III (which can be produced by brominating the symmetrical 1-5-dimethyldiamidoanthraquinone) and one hundred parts of paratoluidin is boiled until the melt has assumed a green color, which is not changed on being further heated. After the reaction mass has been allowed to cool down to about 80° centigrade it is mixed with the equal volume of alcohol, by means of which operation the condensation product separates slowly in the shape of dark-greenish-blue crystals having the following formula:

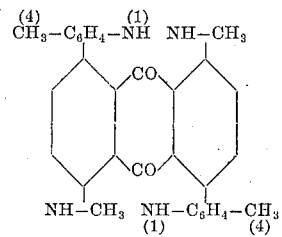

It is filtered off, washed with alcohol, and dried. The condensation product thus obtained is insoluble in water, difficultly soluble in alcohol, and more soluble in hot pyridin and anilin with a green color. By concentrated sulfuric acid it is dissolved with a yellow color, which is changed into green by adding a small quantity of water, which turns pure blue and then violet on the addition of more water, a dark-green precipitate being obtained on adding a larger quantity of water.

The new dyestuff sulfonic acids obtained from the above-mentioned bodies are in the shape of their alkaline salts dark powders soluble in hot water with a green color, which is not changed by the addition of alkalies. On being treated with oxidizing agents in a suitable manner 1-4-5-8-tetraoxyanthraquinone is obtained. They dye unmordanted wool fine green shades.

In order to transform the above-described symmetrical-1-5-dimethyldiamido-4-8-diparatolyldiamidoanthraquinone into the new dyestuff sulfonic acid, ten parts of the finely-pulverized compound are stirred into one hundred parts of sulfuric monohydrate. The resulting solution is then heated to about from 50° to 80° centigrade until a test portion is clearly dissolved by a large quantity of water on adding an excess of ammonia. After cooling donw to about from 10° to 20° centigrade the reaction mass is poured into about one thousand parts of ice-water, by means of which operation the new dyestuff sulfonic acid, which is very difficultly soluble in dilute acids, is precipitated. It is filtered off, and in order to transform it into an alkaline salt it is mixed with an excess of ammonia, dried, and pulverized.

When dry and pulverized, the new coloring-matter is a dark-green powder soluble with a green color in alcohol, pyridin, and water. The color of the watery solution is not essentially changed by the addition of alkalies, while it changes into violet on adding strong mineral acids. By concentrated sulfuric acid (of 66° Baumé) it is dissolved, yielding a violet solution, the color of which turns blue by the addition of a large quantity of water. On heating the acidulated watery solution for some minutes with a small quantity of manganese dioxid ($MnO_2$) and adding afterward sodium bisulfite a brown precipitate of 1-4-5-8-tetraoxyanthraquinone is obtained, which can easily be recognized by its characteristic spectrum in concentrated sulfuric acid. It dyes unmordanted wool from acid-bath green shades.

Having now described our invention and in what manner the same is to be performed, what we claim as new, and desire to secure by Letters Patent, is—

1. The process for producing new anthraquinone dyestuffs, which process consists in first treating symmetrical 1-5-dimethyldiamido-4-8-dialphyldiamidoanthraquinones having the following general formula:

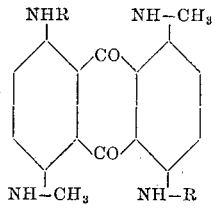

in which formula R means an alphyl radical, with sulfonating agents and then isolating the resulting dyestuff sulfonic acids from the reaction mixture, substantially as hereinbefore described.

2. The process for producing a new anthraquinone dyestuff, which process consists in first treating symmetrical 1-5-dimethyldiamido-4-8-diparatolyldiamidoanthraquinone having the formula:

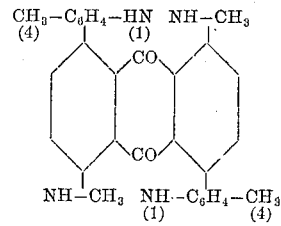

with sulfonating agents, and then isolating the resulting dyestuff sulfonic acid from the reaction mixture, substantially as hereinbefore described.

3. The herein-described new dyestuff sulfonic acids, obtainable by sulfonating symmetrical 1-5-dimethyldiamido-4-8-dialphyldiamidoanthraquinones, which dyestuffs are, in the shape of their alkaline salts, dark powders soluble in hot water with a green color which is not changed by the addition of alkalies, being oxidized by a suitable oxidizing agent to 1-4-5-8-tetraoxyanthraquinone, dyeing unmordanted wool fine green shades, substantially as hereinbefore described.

4. The herein-described new dyestuff sulfonic acid, obtainable by sulfonating symmetrical 1-5-dimethyldiamido-4-8-diparatolyldiamidoanthraquinone, which dyestuff is, in the shape of its alkaline salts, a dark-green powder soluble with a green color in alcohol, pyridin and water, the color of the watery solution being not essentially changed by the addition of alkalies, while it changes into violet on adding strong mineral acids, being dissolved by concentrated sulfuric acid of 66° Baumé with a violet color which turns blue by the addition of a large quantity of water, dyeing unmordanted wool from acid-bath green shades, substantially as hereinbefore described.

In testimony whereof we have signed our names in the presence of two subscribing witnesses.

ROBERT E. SCHMIDT.
ADOLF SERTORIUS.

Witnesses:
OTTO KÖNIG,
J. A. RITTERSHAUS.

It is hereby certified that in Letters Patent No. 687,657, granted November 26, 1901, upon the application of Robert E. Schmidt, of Elberfeld, and Adolf Sertorius, of Flittard, Germany, for an improvement in "Green Anthraquinone Dyes and Processes of Making Same," errors appear in the printed specification requiring correction as follows:

On page 1, the formula, lines 17 to 24,

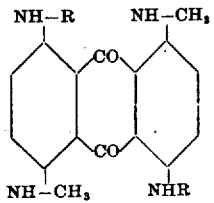 I.  should read  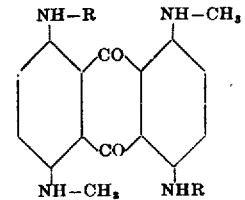 I.

Same page, lines 32 to 39,

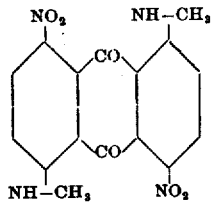 II.  should read  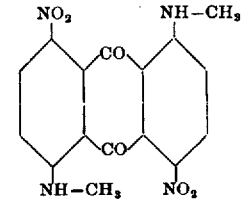 II.

Same page, lines 42 to 49,

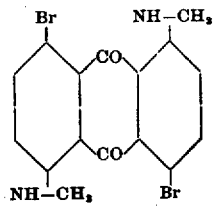 III.  should read  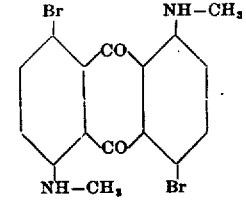 III.

Same page, lines 72 to 80,

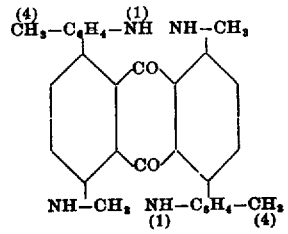  should read  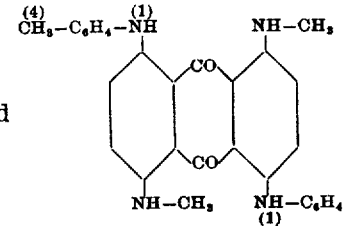

Page 2, lines 48 to 55,

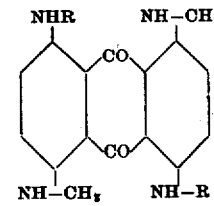  should read  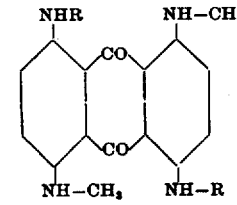

Same page, lines 67 to 75,

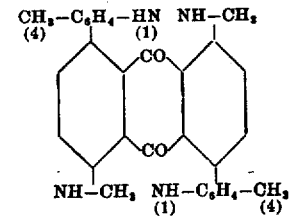  should read  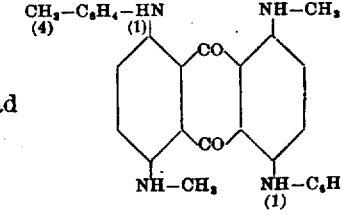

and that the said Letters Patent should be read with these corrections therein, that the same may conform to the record of the case in the Patent Office.

Signed, countersigned, and sealed this 4th day of February, A. D. 1902.

[SEAL.]

F. L. CAMPBELL,
*Assistant Secretary of the Interior.*

Countersigned:
     F. I. ALLEN,
        *Commissioner of Patents.*